April 15, 1924.
A. S. JANIN
1,490,513
LANDING GEAR FOR FLYING MACHINES
Original Filed Sept. 24, 1920
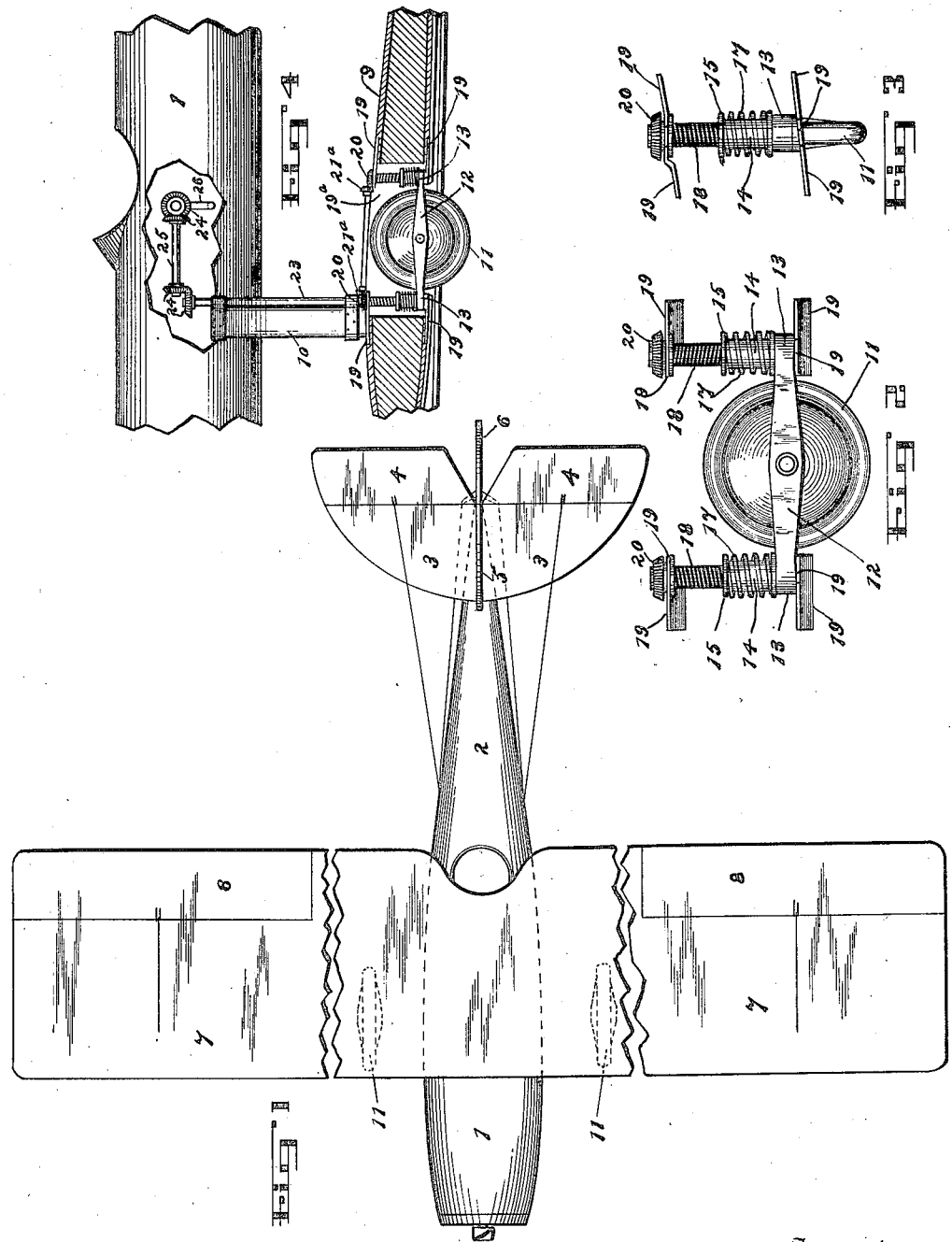
Inventor
ALBERT S JANIN
By Attorney Patented Apr. 15, 1924.

1,490,513

UNITED STATES PATENT OFFICE.

ALBERT S. JANIN, OF FORT WADSWORTH, STATEN ISLAND, NEW YORK, ASSIGNOR TO JAMES V. MARTIN, OF NEW YORK, N. Y.

LANDING GEAR FOR FLYING MACHINES.

Original application filed September 24, 1920, Serial No. 412,591. Divided and this application filed June 24, 1921. Serial No. 480,231.

*To all whom it may concern:*

Be it known that ALBERT S. JANIN, a citizen of the United States, and resident of Fort Wadsworth, Staten Island, in the county of Richmond and State of New York, has invented certain new and useful Improvements in Landing Gears for Flying Machines, of which the following is a specification.

My invention relates to improvements in landing gear to support the machine on the ground and adapted to be raised within the wing when the machine is in the water or in the air to prevent a drag or head resistance on the machine.

This is a divisional application of my application filed Sept. 24th, 1920, Serial Number 412,591.

The invention relates to improvements in landing gear and has reference particularly to a landing gear that can be raised or lowered and locked in any position desired.

The novel features of the invention will be defined in the claims.

In order that my invention may be understood, I shall now proceed to describe the improvements with reference to the accompanying drawing wherein—

Figure 1 is a plan view of the machine which shows the position of the landing gear in dotted lines.

Figure 2 is a side elevation showing the raising, lowering and locking support for the wheels.

Figure 3 is a front elevation of same.

Figure 4 is a fragmentary sectional view of the planes showing means for lowering and raising the wheels.

The flying machine which comprises a stream line fuselage 1, having a tapered portion 2, supporting a horizontal tail piece 3, control elevators, 4, vertical fin 5, and a horizontal rudder 6, an aerofoil 7, to support the machine in the air, and ailerons 8, for balancing the craft during flight.

The machine is supported by the members 10 and 9 and the wheels 11.

The wheels 11 are supported by a longitudinal bearing 12 which is slidable on the sleeve member 14, and the sleeve 14, and the collar 15, is provided with a shoulder 16, supporting a shock absorber 17, to take the shock when the machine is landing on the ground.

The worm shaft 18, which operates the sleeve member 14, to raise or lower the wheels 11, is provided at their ends with flange member 19, which are fastened or bolted on the member 9 at each end of the slots or openings 19$^a$, for the wheels 11.

The gears 20 are fastened on and operates the worm shafts 18, which is operated by the gears 21, and shaft 22 and 23. The shaft 23 is operated by the gears 24 and shaft 25 by the crank 26.

The operation for raising, lowering and locking the wheels are as follows:

The crank 26 located in the fuselage 1, are rotated, turning the gears 24, the shaft 25 and 23, thereby operating the gears 21, and 21$^a$, thereby operating the gears 20, in turn operating the spiral shaft 18 which carries the sleeve member 14, and the wheel bearing 12, thereby raising and lowering the wheels in any position and locking same in said position automatically.

It will be obvious from the foregoing description that the device is susceptible of various modifications without materially departing from the principle and spirit of the invention, and for this reason, I do not desire to limit myself to the precise form and arrangement of the parts therein set forth.

Having thus described my invention what I claim and desire to secure by Letters Patent is:

1. In an aeroplane, a supporting wing provided with a slot in its lower skin, a wheel provided with a resilient mounting located within said wing and said wheel adapted to be retracted through the said slot and means to retract the said wheel.

2. In an aeroplane, a wing a resilient mounting for a wheel, located between the upper and lower skins of the said wing, and means to retract the said wheel.

3. In an aeroplane adapted to alight on the water, a wing provided with a slot in its lower surface and a resiliently mounted wheel adapted to be adjusted in and out of said slot, said wheel being further adapted for the yielding support of the said aeroplane in different adjusted positions, and retracting mechanism for said wheel located within the said wing.

4. In combination with an aeroplane wing a resiliently mounted wheel, an opening provided in the bottom surface of the said wing mechanism located within the wing surfaces for the retraction of the said wheel through the said opening, said mechanism being adapted to hold the said wheel in any position to which it is moved.

5. In an aeroplane provided with a wing and a body, a resiliently mounted wheel adapted to be retracted through the lower surface of the said wing, retracting mechanism located within the said wing to retract the said wheel, and operating means connecting said mechanism with the interior of said body for retracting said wheel.

6. The combination within an aeroplane wing of a resilient mounting for an aeroplane alighting gear and mechanism for retracting the said alighting gear through the lower surface of the said wing.

Signed at borough of Richmond, in the county of Richmond and State of New York, this 23d day of June A. D. 1921.

ALBERT S. JANIN.